Oct. 19, 1943.  E. J. McEACHRON ET AL  2,332,456
CELL CONSTRUCTION
Filed Oct. 3, 1940
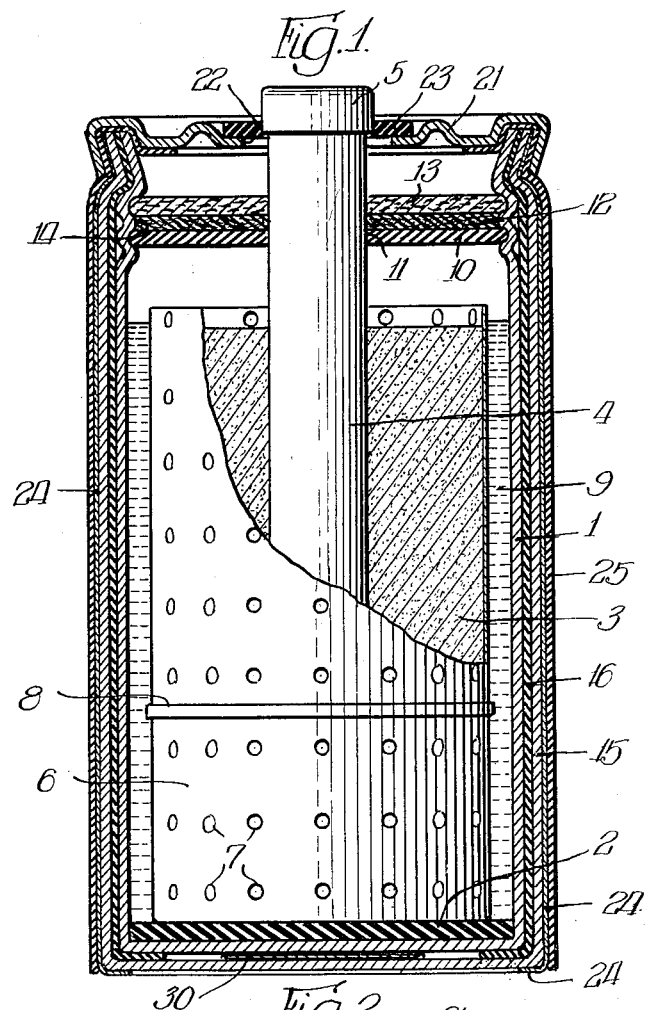
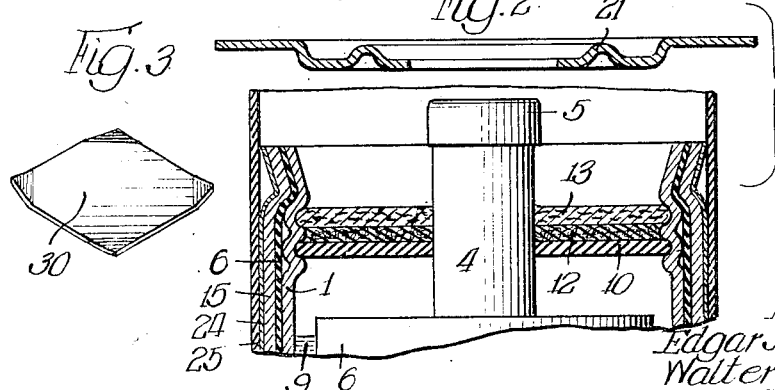
Inventors:
Edgar J. McEachron,
Walter H. Thorn,
George H. Schroeder,
Reginald S. Johnson,
BY Wilkinson, Huxley, Byron and Knight
Attys.

Patented Oct. 19, 1943

2,332,456

UNITED STATES PATENT OFFICE 2,332,456

CELL CONSTRUCTION

Edgar J. McEachron, Walter H. Thom, George H. Schroeder, and Reginald S. Johnson, Wausau, Wis., assignors to Marathon Battery Company, Wausau, Wis., a corporation of Wisconsin Application October 3, 1940, Serial No. 359,536

11 Claims. (Cl. 136—133)

This invention relates to improvements in electrical dry cells, and more particularly to a novel construction therefor which renders the cell more durable and free from liability of leakage and resulting damage to the exterior of the cell and the surrounding parts with which the cell may be associated in use.

This application is a continuation in part of the applicants' co-pending application Serial No. 313,828, filed January 15, 1940.

With dry cells of this general character it sometimes occurs that the zinc can is partially consumed and corroded during the use of the cell, whereby the walls thereof are actually eaten through so that one or more perforations are formed through which the electrolyte housed within the can is forced or otherwise leaks out to the exterior thereof. Due to the generation of gases within the cell during the period of use, the interior of the cell is frequently under some slight pressure which forces the electrolyte out through the perforations so formed, with the result that the electrolyte does considerable damage to the exterior of the cell as well as to the appliance in which the cell may be used. For instance, with cells used in flashlight casings it sometimes happens that the exuding electrolyte comes in contact with the interior of the flashlight casing and does considerable damage to the casing itself and causes the cell to become stuck within the casing whereby it is difficult if not impossible to remove the same for replacement without doing greater damage to the casing itself.

Accordingly, it is an object of this invention to provide a practical, inexpensive and efficient cell having a protective casing which entirely eliminates the danger of leakage from the cell and the consequent elimination of the disadvantages which result from such leakage.

Other objects not specifically enumerated will be apparent to one skilled in the art upon consideration of the specific embodiment of this invention hereinafter described in detail, which embodiment is given merely by way of illustration without intending to limit the invention other than as set forth in the appended claims.

In the drawing—

Figure 1 represents an enlarged cross sectional view in elevation of a dry cell constructed in accordance with the present invention;

Figure 2 is a fragmentary view of the upper part of the cell taken in elevation and showing the closing top displaced, with the parts formed as they are prior to the application of the top; and Figure 3 is an enlarged perspective view of the spring plate located between the bottom of the zinc can and the bottom of the outer protective container.

By referring to the drawing, it will be noted that the illustrated embodiment comprises an inner zinc can 1 which may be of usual construction and which may be formed with the side wall integral with the bottom, as by a drawing operation. In the bottom of the can is preferably placed an insulating disc 2 on which the core of depolarizing mixture 3 is seated. The core of depolarizing mixture may be of usual character and has embedded centrally therein a carbon pencil 4 which is preferably equipped with a metal finishing cap 5 at its upper end. The core of depolarizing material is preferably wrapped in any suitable material, such as porous paper 6, provided with perforations 7, which may be held in place thereon by suitable means, such as elastic band 8. The core is of less diameter than the interior of the zinc can 1 and is placed centrally thereof so as to provide an annular space between the core and the sides of the can, in which is placed a suitable electrolyte 9. A waterproof, non-porous and non-conductive washer 10 is preferably placed around the carbon pencil 4 so as to provide a press fit as at 11. In order to further seal the cell, a layer of asphalt 12 may be placed on top of the washer 10, and, further, a closing disc 13 may be applied over the asphalt. The disc 13 may be made of fiber or other waterproof, resistant material.

The wall of the zinc can 1 is preferably crimped as indicated at 14 adjacent its upper edge to provide a tight joint for the closing discs and asphalt. If desired, a thin layer of thermo-plastic material, such as paraffin, may be applied over the washers to further insure a tight seal for the interior of the cell.

The construction thus far described is the preferred type of metal-top flashlight cell without the metal top, but it is to be understood that other suitable cell constructions may be utilized. The present invention further includes a protective casing for the interior parts of the cell itself, and, therefore, this invention contemplates various different forms of cell constructions suitable for the purpose intended.

According to this invention, a second can or container 15 is provided which is of larger diameter and of slightly greater depth than the zinc can 1, and is adapted to contain the cell in the manner disclosed in the drawing. Placed between the outside wall of the zinc can 1 and the inner wall of the container 15 is a layer of absorbent material 16, which may be of paper, such as blotting paper or the like, which substantially fills the space between the inside walls of the outer container 15 and the outside walls of the zinc can 1. As a suitable material for layer 16 may be mentioned so-called "sandwich board" now available on the market, which is composed of two layers of kraft paper with a layer of asphalt between. When "sandwich board" is used, the inside layer of paper acts as an absorbent means, and the asphalt will prevent or delay contact with the outer container of any electrolyte that may exude from the container. The term "absorbent material" as used herein is intended to include all materials, including those named herein, which are suitable for the purpose intended. The layer of absorbent material 16 need not extend all the way to the bottom of the outer container 15 but preferably extends down to the bottom of the inner can 1 and slightly thereunder, as shown in the drawing.

The outer container 15 may be made of any suitable material, such as a conductive metal, but is preferably made of zinc. It may be formed with an integral side and bottom as shown, and if made of zinc it may be made by a drawing operation and thus be produced at a relatively low cost by methods and means similar to that used in the production of the usual zinc cans 1.

Located in the space between the bottom of the outer container 15 and the botto mof the zinc can 1 is a spring metal plate 30 having good electrical conducting properties which insure good electrical connection between the inner zinc can 1 and the bottom of the outer container 15. This spring plate 30 may be of any suitable construction, as, for instance, the construction illustrated in Figure 3. When constructed in this manner, the spring may be inserted in the outer container by merely dropping the same into the bottom of the container as it functions satisfactorily irrespective of which side may be uppermost. Obviously, the spring will always have two of its corner portions in contact with the outer container 15, while its other two corner portions are in engagement with the zinc can 1, irrespective of which side of the spring plate faces upwardly. The spring plate 30 is originally bowed to a slightly greater extent than is required to fill the space between the inner and outer containers, so that when the cell is finally assembled the plate 30 is maintained under slight compression, whereby it insures good electrical conductivity between the inner can and the outer container.

Adjacent the top of the cell, the zinc can 1 is preferably enlarged slightly outwardly and the outer container 15 is similarly formed, as clearly shown in Figure 1 of the drawing. The absorbent paper liner 16 extends all the way to the top of the zinc can 1 and the outer container 15 so that when the zinc can 1 is pressed downwardly into the outer container 15 to its final position against the tension of the spring 30, the upper edges of the zinc can 1 and the outer container 15 and the intermediate paper liner 16 are all substantially even.

On the exterior of the outer container 15, there is preferably provided a coat of paint 24 which may extend down to the bottom edge of the can and under the edges of the bottom in the manner illustrated in Figure 1, so as to thoroughly protect the exterior of the can and to provide a neat and pleasing appearance.

On the side walls there is also provided a wrapper 25 which not only serves as a further protection for the side walls of the outer container but may also serve as a label when provided with suitable printed and decorative material. This wrapper may be made of a fairly stout insulating material in order to thoroughly protect the side walls of the outer container 15 against accidental contact which may in certain installations, such as in flashlights, short-circuit the cell. In the form of the invention here illustrated, the layer of paint 24 extends all the way to the top edge of the outer container 15.

As shown in Figure 2, the outer wrapper 25 is preferably of greater height than the height of the cell, whereby it extends upwardly above the upper edge thereof so that it is adapted to be folded inwardly to serve as an insulation between the upper edges of the inner and outer containers and a metallic closing cap 21. The closing cap 21 has a central opening 22 of sufficient diameter to surround the projecting end of the carbon pencil without touching the same and without liability of contact therewih. The metal cap 21 is in the nature of a protecting cap for closing the cell itself and is somewhat similar to the metal caps now in use in cells of this general type. However, as used in the present invention, the metal cap 21 also serves as an additional holding means entering into the assembly of the inner and outer containers.

In addition to the metal cap 21, an insulating washer 23 may be provided for closing the space between the carbon pencil and the inner edge of the metal cap. This washer may be so designed as to snugly fit the sides of the carbon pencil or the cap 5 thereof, and to remain in position thereon against accidental displacement.

In assembling the cell, it is to be noted particularly that the layer of absorbent material 16 not only extends downwardly to the base of the inner container 1 but underlies the bottom thereof at its margins. The extent to which the absorbent material 16 underlies the inner container may be determined when it is understood that its purpose is to effectively seal the space between the bottoms of the inner and outer containers from the space between the side walls thereof, or, in other words, the space occupied by the absorbent material itself. This seal is created by pressing the inner container downwardly under sufficient pressure to cause the underlying portion of the absorbent material 16 to be compressed so that a tight packing is produced which effectively prevents any of the electrolyte which may enter the region occupied by the absorbent material from flowing downwardly into the space between the bottoms of the inner and outer containers, respectively. This compression is produced in the assembly operation prior to the time that the crimping formation is given to the upper portions of the containers.

In assembling the cell of this invention, the spring plate 30, illustrated in Figure 3, may be first dropped into the interior of the outer container 15 and thereafter the absorbent material may be applied either by placing the same inside of the outer container or wrapping it around the exterior of the inner container 1 before the latter is inserted into the outer container. After the inner container is inserted with the absorbent material occupying the intervening space as shown in Figure 1, a downward pressure is placed on the inner container for creating the high compression at the margins of the inner container, as previously described. This serves to compress the underlying portion of the intermediate absorbent layer and effectively seal the bottom space from the space between the side walls. The downward pressure of the inner container also serves to compress the spring plate 30 and to maintain the same under compression whereby the spring plate will provide a good electrical connection between the inner and outer containers. With the inner container so compressed within the outer container, the upper edges of both are subjected to a rolling operation which forms them in the manner illustrated in Figure 2 and holds the inner container in its innermost position with the spring and absorbent material under compression as described. The rolling operation just referred to is preferably only applied to the upper edge of the inner and outer cans and is not utilized to form the disc-holding grooves 14 adjacent the top of the inner can 1. These grooves 14 are preferably formed by a separate operation carried out before the inner can 1 is inserted in the outer can.

The above-described assembly operation is preferably carried out after the insulating disc 2, core 4 and electrolyte 9 have been introduced into the inner container. The sealing disc 10, asphalt 12 and top disc 13 may be added either before or after the inner container is assembled in the outer container. Thereafter, the finishing wrapper 25 may be applied over the painted surface. The paint 24 may be applied either before or after the inner container is inserted, but in any event, the wrapper 25 is folded over the upper edges of the inner and outer containers, and in a final operation a metal cap 21 is brought into position and crimped upon the upper edge of the can and the washer 23 added, to produce the finished cell as illustrated in Figure 1.

It will be noted that the extension on the upper edge of the wrapper 25 thoroughly insulates the metal cap 21 from the upper edges of the inner and outer containers, respectively. This prevents any short-circuiting between the cap 5 of the pencil 4 and the closing cap 21, such as might otherwise occur when the cell comes in contact with various conducting elements. Inasmuch as the inner edge of the cap 21 is out of contact with the carbon pencil 4 and is protected by the insulating washer 23, the cap itself is out of electrical connection with both of the electrodes of the cell.

By extending the paint coating 24 all the way down to the base of the cell and underlying the bottom edge thereof, a very neat and finished appearance is produced; but it will be noted that the central portion of the base of the outer container is left unpainted so that good electrical contact may be made with the base of the cell when the same is placed in use.

From the above description it will be noted that a very simple and yet compact cell construction is provided by this invention, which includes an outer protective metal casing that insures against leakage of the electrolyte irrespective of the condition of the inner zinc can. It is further apparent that the entire assembly is capable of being manufactured by simple and inexpensive operations and that the manufacture thereof merely requires the preliminary formation of the inner cell construction, the insertion of the absorbent layer and spring, the introduction of the cell into the outer container, and the final crimping of the upper edges of the two containers after the insulating wrapper has been properly located over the upper edges of the containers. The closing metal cap 21 is preferably tightly crimped so as to produce a strong unitary construction with the spring under compression.

It will further be noted that a protective outer casing has been provided without in any way impairing the ability to secure good electrical contacts with the electrodes of the cell. The carbon pencil electrode is maintained the same as in a cell where no protective casing is provided, and a good electrical connection with the inner zinc can is at all times maintained by the spring 30.

In the foregoing specification and in the appended claims, it is to be understood that the absorbent material 16 is characterized as being impervious to the electrolyte, whereby it will prevent the penetration thereof to the outer container as well as serving as a means for absorbing the same.

What is claimed is:

1. A non-leaking dry cell having circuit terminals at its opposite ends, comprising a pair of open mouthed cup-shaped containers of conducting material, one disposed within the other, the inner container constituting a zinc electrode and having therein dry cell elements including an electrolyte, depolarizing material and an electrode pencil, said outer container being in electrical contact with said inner container and said containers having their upper edges substantially coextensive, means for closing said cell comprising a non-conducting material closely engaging said electrode pencil and closely engaging one of said containers, and a metallic cover in crimping engagement with the upper edges of said two containers.

2. A non-leaking dry cell having circuit terminals at its opposite ends, comprising a pair of open mouthed cup-shaped containers of conducting material, one disposed within the other and having a space therebetween at the sides and bottoms thereof, the inner container constituting a zinc electrode and having therein dry cell elements including an electrolyte, depolarizing material and an electrode pencil, said inner and outer containers having their upper edges substantially coextensive and the upper portions of their walls interlocked to hold said containers against displacement, absorbent material substantially impervious to electrolyte located in the space between the sides of the two said containers, a conducting spring member in the space between the bottoms of said two containers for insuring electrical connection therebetween, and means for closing said cell.

3. A non-leaking dry cell having circuit terminals at its opposite ends, comprising a pair of open mouthed cup-shaped containers of conducting material, one disposed within the other and having a space therebetween at the sides and bottoms thereof, the inner container constituting a zinc electrode and having therein dry cell elements including an electrolyte, depolarizing material and an electrode pencil, said inner and outer containers having their upper edges substantially coextensive and the upper portions of their walls interlocked to hold said containers against displacement, absorbent material substantially impervious to electrolyte located in the space between the sides of the two said containers, a conducting spring member in the space between the bottoms of said two containers for insuring electrical connection therebetween, and means for closing said cell, said spring being maintained under initial compression.

4. A non-leaking dry cell having circuit terminals at its opposite ends, comprising a pair of open mouthed, cup-shaped containers of conducting material, one disposed within the other and having a space therebetween at the sides and bottoms thereof, the inner container constituting a zinc electrode and having therein dry cell elements including an electrolyte, depolarizing material and an electrode pencil, said inner and outer containers having their upper edges substantially coextensive and the upper portions of their walls interlocked to hold said containers against displacement, absorbent material substantially impervious to electrolyte located in the space between the sides of the two said containers, a conducting spring member in the space between the bottoms of said two containers for insuring electrical connection therebetween, means for closing said cell, a metallic cover member in crimping relation to the upper edges of said two containers, said spring being maintained under initial compression, and insulating means protecting the outer surfaces of the side walls of said outer container.

5. A non-leaking dry cell having circuit terminals at its opposite ends, comprising a pair of open mouthed cup-shaped containers of conducting material, one disposed within the other and having a space therebetween at the sides and bottoms thereof, said outer container being in electrical contact with said inner container, the inner container constituting a zinc electrode and having therein dry cell elements including an electrolyte, depolarizing material and an electrode pencil, absorbent material which is substantially impervious to electrolyte located in the space between the sides of the two said containers and extending under the margins of the bottom of said inner container, said containers being mechanically held in association in such position that said inner container is pressed downwardly to an extent whereby it exerts a sealing compressive force on said absorbent material underlying the bottom thereof, and means for closing said cell.

6. A non-leaking dry cell having circuit terminals at its opposite ends, comprising a pair of open mouthed cup-shaped containers of conducting material, one disposed within the other and having a space therebetween at the sides and bottoms thereof, the inner container constituting a zinc electrode and having therein dry cell elements including an electrolyte, depolarizing material and an electrode pencil, absorbent material which is substantially impervious to electrolyte located in the space between the sides of the two said containers and extending under the margins of the bottom of said inner container, said containers being mechanically held in association in such position that said inner container is pressed downwardly to an extent whereby it exerts a sealing compressive force on said absorbent material underlying the bottom thereof, electrical conducting means between the bottoms of said inner and outer containers for maintaining electrical contact therebetween, and means for closing said cell.

7. A non-leaking dry cell having circuit terminals at its opposite ends, comprising a pair of open-mouthed, cup-shaped containers of conducting material, one disposed within the other and having their side walls in spaced relation, the inner container constituting a zinc electrode and having therein dry cell elements including an electrolyte, depolarizing material and an electrode pencil, said containers being electrically connected and having absorbent material in the space between their side walls, and said containers having their upper edges substantially coextensive and the upper portions of their walls interlocked to hold said containers against displacement, means for closing said cell comprising a non-conducting material closely engaging said electrode pencil and closely engaging one of said containers, and a metallic cover in crimping engagement with the upper edges of said two containers.

8. A non-leaking dry cell having circuit terminals at its opposite ends, comprising a pair of open-mouthed, cup-shaped containers of conducting material, one disposed within the other and having their side walls in spaced relation, the inner container constituting a zinc electrode and having therein dry cell elements including an electrolyte, depolarizing material and a electrode pencil, said containers being electrically connected and having absorbent material in the space between their side walls, and said containers having their upper edges substantially coextensive and the upper portions of their walls interlocked to hold said containers against displacement, means for closing said cell comprising a non-conducting material closely engaging said electrode pencil and closely engaging one of said containers, a metallic cover in crimping engagement with the upper edges of said two containers, and means insulating said cover member from said containers.

9. A non-leaking dry cell having circuit terminals at its opposite ends comprising a pair of open-mouthed, cup-shaped containers of conducting material, one disposed within the other and having space between the bottoms and side walls thereof, the inner container constituting a zinc electrode and having therein dry cell elements including an electrolyte, depolarizing material and an electrode pencil, a conducting spring in the space between the bottoms of said containers providing electrical connection therebetween, absorbent means between the side walls of said containers, and means for closing said cell.

10. A non-leaking dry cell having circuit terminals at its opposite ends comprising a pair of open-mouthed, cup-shaped containers of conducting material, one disposed within the other and having space between the bottoms and side walls thereof, the inner container constituting a zinc electrode and having therein dry cell elements including an electrolyte, depolarizing material and an electrode pencil, a conducting spring in the space between the bottoms of said containers providing electrical connection therebetween, absorbent means between the side walls of said containers, and insulating means protecting the outer surface of the side walls of said outer container.

11. A non-leaking dry cell having circuit terminals at its opposite ends comprising a pair of open-mouthed, cup-shaped containers of conducting material, one disposed within the other and having space between the bottoms and side walls thereof, the inner container constituting a zinc electrode and having therein dry cell elements including an electrolyte, depolarizing material and an electrode pencil, a conducting spring in the space between the bottoms of said containers providing electrical connection therebetween, absorbent means between the side walls of said containers, a metallic cover member in crimping relation with the upper edges of said two containers, and means for insulating said metallic cover member from said containers.

EDGAR J. McEACHRON.
WALTER H. THOM.
GEORGE H. SCHROEDER.
REGINALD S. JOHNSON.